US011706374B2

(12) United States Patent
Wang et al.

(10) Patent No.: US 11,706,374 B2
(45) Date of Patent: Jul. 18, 2023

(54) METHODS AND APPARATUS FOR RE-TIMING AND SCALING INPUT VIDEO TRACKS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/226,823

(22) Filed: Apr. 9, 2021

(65) Prior Publication Data

US 2021/0321019 A1 Oct. 14, 2021

Related U.S. Application Data

(60) Provisional application No. 63/008,976, filed on Apr. 13, 2020.

(51) Int. Cl.
*H04N 5/05* (2006.01)
*H04N 21/435* (2011.01)
(Continued)

(52) U.S. Cl.
CPC .............. *H04N 5/05* (2013.01); *H04N 9/8205* (2013.01); *H04N 21/23608* (2013.01); *H04N 21/435* (2013.01); *H04N 21/816* (2013.01)

(58) Field of Classification Search
CPC .. H04N 5/05; H04N 9/8205; H04N 21/23608; H04N 21/435; H04N 21/816
See application file for complete search history.

(56) References Cited

U.S. PATENT DOCUMENTS

| 2018/0336927 A1* | 11/2018 | Bradley ............. H04N 5/23248 |
| 2020/0092530 A1 | 3/2020 | Wang et al. |
| 2020/0111510 A1 | 4/2020 | Wang et al. |

OTHER PUBLICATIONS

[No Author Listed], Derived visual tracks in the ISO base media file format. International Organisation for Standardisation, Coding of Moving Pictures and Audio, ISO/IEC JTC1/SC29/WG11/N19027. Jan. 2020:26 pages.

(Continued)

*Primary Examiner* — Thai Q Tran
*Assistant Examiner* — Jose M Mesa
(74) *Attorney, Agent, or Firm* — Wolf, Greenfield & Sacks, P.C.

(57) ABSTRACT

The techniques described herein relate to methods, apparatus, and computer readable media configured to access multimedia data comprising a hierarchical track structure comprising at least a first track at a first level of the hierarchical track structure comprising first media data, wherein the first media data comprises a first sequence of video media units, and a second track at a second level in the hierarchical track structure different than the first level of the first track, the second track comprising metadata specifying a re-timing derivation operation. Output video media units are generated according to the second track, comprising performing the re-timing derivation operation on the first sequence of video media units to modify a timing of the first sequence of video media units by removing one or more video media units associated with the re-timing derivation operation and/or shifting timing information of the first sequence of video media units.

20 Claims, 8 Drawing Sheets

Access a first track of multimedia data at a first level of a hierarchical track structure, which includes first media data that includes a first sequence of video media units 802

Access a second track at a second level in the hierarchical track structure that is different than the first level, which includes metadata specifying a re-timing derivation operation 804

Generating output video media units according to the second track by performing the re-timing derivation operation on the first sequence of video media units to modify a timing of the first sequence of video media units 806

(51) Int. Cl.
*H04N 21/81* (2011.01)
*H04N 21/236* (2011.01)
*H04N 9/82* (2006.01)

(56) References Cited

OTHER PUBLICATIONS

Hannuksela et al., Technologies under Consideration on ISO/IEC 23008-12. International Organisation for Standardisation, Coding of Moving Pictures and Audio, ISO/IEC JTC1/SC29/WG11/N18586. Jul. 2019:21 pages.

Hannuksela et al., Technologies under Consideration on ISO/IEC 23008-12. International Organisation for Standardisation, Coding of Moving Pictures and Audio, ISO/IEC JTC1/SC29/WG11/N19011. Jan. 2020:18 pages.

* cited by examiner

METHODS AND APPARATUS FOR RE-TIMING AND SCALING INPUT VIDEO TRACKS

RELATED APPLICATIONS

This application claims priority under 35 U.S.C. § 119(e) to 63/008,976, filed Apr. 13, 2020, and entitled "METHODS OF TRACK DERIVATION FOR RE-TIMING AND SCALING INPUT TRACKS IN ISOBMFF," which is hereby incorporated by reference herein in its entirety.

TECHNICAL FIELD

The techniques described herein relate generally to re-timing and scaling input video tracks, including of video tracks in the ISO Base Media File Format (ISOBMFF).

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for re-timing and/or scaling input video tracks to a track derivation process, such as input tracks to a track derivation operation in ISOBMFF.

Some embodiments relate to a method implemented by at least one processor in communication with a memory, wherein the memory stores computer-readable instructions that, when executed by the at least one processor, cause the at least one processor to perform accessing multimedia data comprising a hierarchical track structure comprising at least: a first track at a first level of the hierarchical track structure comprising first media data, wherein the first media data comprises a first sequence of video media units; and a second track at a second level in the hierarchical track structure that is different than the first level of the first track, the second track comprising metadata specifying a re-timing derivation operation; and generating output video media units according to the second track, comprising performing the re-timing derivation operation on the first sequence of video media units to modify a timing of the first sequence of video media units by (a) removing one or more video media units associated with the re-timing derivation operation, (b) shifting timing information of the first sequence of video media units, or both.

In some examples, the first sequence of video media units comprises a sequence of samples, the metadata specifies an operation to skip a sample of the sequence of samples, and generating the output video media units comprises omitting the sample and generating the output video media units so that the output video media units do not include the sample.

In some examples, the first sequence of video media units comprises a sequence of samples, the metadata specifies a plurality of operations to skip associated samples of the sequence of samples, and generating the output video media units comprises omitting the samples and generating the output video media units so that the output video media units do not include the samples.

In some examples, each of the operations is associated with one sample.

In some examples, each video media unit of the first sequence of video media units comprises an associated media time of a media timeline of the first sequence of video media units;

the metadata specifies an operation to shift the media timeline by a specified number of time units, and generating the output video media units comprises shifting the media time associated with each video media unit by the specified number of time units and generating the output video media units so that the output video media units comprise a shifted media timeline.

In some examples, the specified number of time units is a negative value, and shifting the media time associated with each video media unit by the specified number of time units comprises subtracting the specified number of time units from the media time associated with each video unit.

In some examples, the specified number of time units is a positive value, and shifting the media time associated with each video media unit by the specified number of units comprises adding the specified number of time units to the media time associated with each video unit.

In some examples, the first track is an input track, and the first media data of the first track comprises a plurality of samples, and the second track comprises a derived track, and the metadata specifies the re-timing derivation operation for a sample of the plurality of samples of the input track, and generating the output video media units comprises generating output video media samples for an output track.

Some embodiments relate to an apparatus comprising a processor in communication with memory, the processor being configured to execute instructions stored in the memory that cause the processor to perform accessing multimedia data comprising a hierarchical track structure comprising at least: a first track at a first level of the hierarchical track structure comprising first media data, wherein the first media data comprises a first sequence of video media units; and a second track at a second level in the hierarchical track structure that is different than the first level of the first track, the second track comprising metadata specifying a re-timing derivation operation; and generating output video media units according to the second track, comprising performing the re-timing derivation operation on the first sequence of video media units to modify a timing of the first sequence of video media units by (a) removing one or more video media units associated with the re-timing derivation operation, (b) shifting timing information of the first sequence of video media units, or both.

In some examples, the first sequence of video media units comprises a sequence of samples, the metadata specifies an operation to skip a sample of the sequence of samples, and generating the output video media units comprises omitting the sample and generating the output video media units so that the output video media units do not include the sample.

In some examples, the first sequence of video media units comprises a sequence of samples, the metadata specifies a plurality of operations to skip associated samples of the sequence of samples, and generating the output video media units comprises omitting the samples and generating the output video media units so that the output video media units do not include the samples.

In some examples, each of the operations is associated with one sample.

In some examples, each video media unit of the first sequence of video media units comprises an associated media time of a media timeline of the first sequence of video media units, the metadata specifies an operation to shift the media timeline by a specified number of time units, and generating the output video media units comprises shifting the media time associated with each video media unit by the specified number of time units and generating the output video media units so that the output video media units comprise a shifted media timeline.

In some examples, the specified number of time units is a negative value, and shifting the media time associated with each video media unit by the specified number of time units comprises subtracting the specified number of time units from the media time associated with each video unit.

In some examples, the specified number of time units is a positive value, and shifting the media time associated with each video media unit by the specified number of units comprises adding the specified number of time units to the media time associated with each video unit.

In some examples, the first track is an input track, and the first media data of the first track comprises a plurality of samples, and the second track comprises a derived track, and the metadata specifies the re-timing derivation operation for a sample of the plurality of samples of the input track, and generating the output video media units comprises generating output video media samples for an output track.

Some embodiments relate to an apparatus comprising a processor in communication with memory, the processor being configured to execute instructions stored in the memory that cause the processor to perform: encoding multimedia data comprising a hierarchical track structure comprising at least: a first track at a first level of the hierarchical track structure comprising first media data, wherein the first media data comprises a first sequence of video media units; and a second track at a second level in the hierarchical track structure that is different than the first level of the first track, the second track comprising metadata specifying a re-timing derivation operation, such that output video media units can be generated according to the second track by performing the re-timing derivation operation on the first sequence of video media units to modify a timing of the first sequence of video media units by (a) removing one or more video media units associated with the re-timing derivation operation, (b) shifting timing information of the first sequence of video media units, or both.

In some examples, the first sequence of video media units comprises a sequence of samples, and the metadata specifies an operation to skip a sample of the sequence of samples, such that the output video media units can be generated by omitting the sample and generating the output video media units so that the output video media units do not include the sample.

In some examples, the first sequence of video media units comprises a sequence of samples, and the metadata specifies a plurality of operations to skip associated samples of the sequence of samples, such that the output video media units can be generated by omitting the samples and generating the output video media units so that the output video media units do not include the samples.

In some examples, each of the operations is associated with one sample.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

Figure 1:
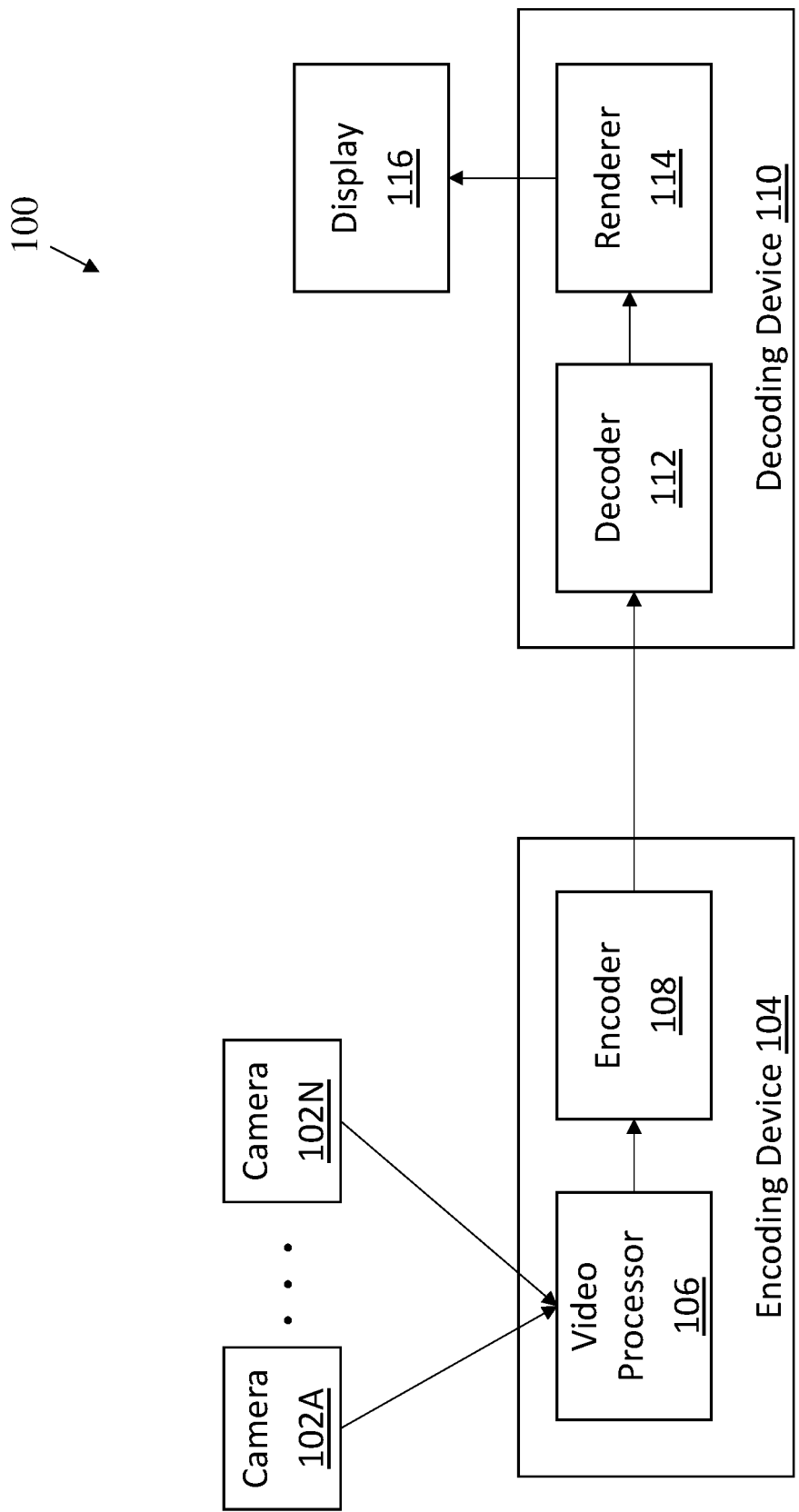
FIG. 1 shows an exemplary video coding configuration, according to some embodiments.

The ISO Base Media File Format (ISOBMFF) provides for track derivations in which generally one or more input tracks are processed to generate an output/derived track. However, the inventors have appreciated that deficiencies exist in conventional approaches to perform track-retiming. In the working draft of ISOBMFF, to re-time a track it is suggested to use an edit list to perform temporal re-timing. In particular, the working draft notes that since a derived track may have an edit list, it is possible to re-time a track by using a derived track with an identity transform (which reproduces the input image) and an edit-list that causes the temporal re-timing. For an identity transform, when the identity transform operation is present in a sample, (a) the identity transform operation reproduces the input image, and (b) no other transform operations should be present in the sample. As an example, if it is desired to trim the first ten seconds of a track, an identity track can be used with an edit list to perform the ten second trim.

The inventors have discovered and appreciated that such a temporal re-timing approach can suffer from various deficiencies. One deficiency relates to the use of the presentation timeline when using an edit list. The presentation timeline is used to specify how the samples are presented for viewing. The presentation timeline may be different than the composition timeline, which is essentially the timeline that is used to compose or put together the samples in the track (e.g., such that the composition timeline can be viewed like the original timeline of the content). For example, the content can be presented at a faster speed than the original composition timeline, such that two seconds of the composition timeline correspond to just one second at the presentation timeline. The working draft states that the derived track may have edit lists, which when present provide the timing and number of output samples of the derived track on the presentation timeline (or if a derived track does not have an edit list, then its presentation timeline is equal to its composition timeline). Therefore, temporal re-timing performed using the edit list is done on the presentation timeline and not the composition timeline. For example, if an edit list is used to perform a re-timing that trims the first ten seconds, then the samples at 10 seconds will become the first sample of the presentation timeline (e.g., such that the presentation timeline will start at ten seconds of the composition timeline).

Re-mapping onto the presentation timeline can be an issue because once the samples are provided on the presentation timeline, it is not possible to perform subsequent operations that are performed with respect to the composition timeline. Therefore, a derived track that uses an identity transform together with an edit list to perform temporal re-timing cannot be further manipulated by operations performed using the composition timeline. Additionally, such a re-mapped derived track that uses edit lists would not be able to be used as an input track to other derived tracks for derived track composition. In particular, the design principles in Section 1 of the working draft states that "the input tracks shall not have edit lists." Therefore, a derived track that uses an identity transform together with an edit list to perform temporal re-timing cannot be provided as input into subsequent derivation operations. As a result, it is not possible to perform some operations using edit lists that would otherwise require applying multiple edit lists across multiple derived tracks. Therefore, conventional approaches that leverage an edit list for re-timing are not useable in scenarios when it is desirable to build a hierarchy of derived tracks (e.g., where it is desirable to perform subsequent transformations on a re-mapped derived track).

The techniques described herein provide for re-timing track derivation operations that can be used to process sequences of video media samples, such as samples in the forms of chucks, fragments, segments, sections, and/or the like, which come from the input tracks of the track derivation operation. Examples of such temporal processing include skipping multimedia content (e.g., such that the skipped multimedia content from the input track is not in the derived track) and/or shifting multimedia content (e.g., such that the shifted multimedia content comprises a modified timeline that is shifted forwards or backwards by a specified number of time units). The re-timing derivation operations can be provided as extensions of a visual derivation base class that can be used to specify derivation transformation operations. As a result, the aforementioned limitations of conventional techniques can be avoided since derived tracks generated using the techniques provided herein can be (a) maintained on the composition timeline and/or (b) used as inputs to further track derivation operations. The techniques therefore provide for robust re-timing opportunities that can support complex re-timing (e.g., for multiple add insertions) that are not otherwise possible using conventional techniques. According to examples of the techniques described herein, a derived track contains samples that contain derivation operations to be applied to samples of an input track to generate the output samples of an output track.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
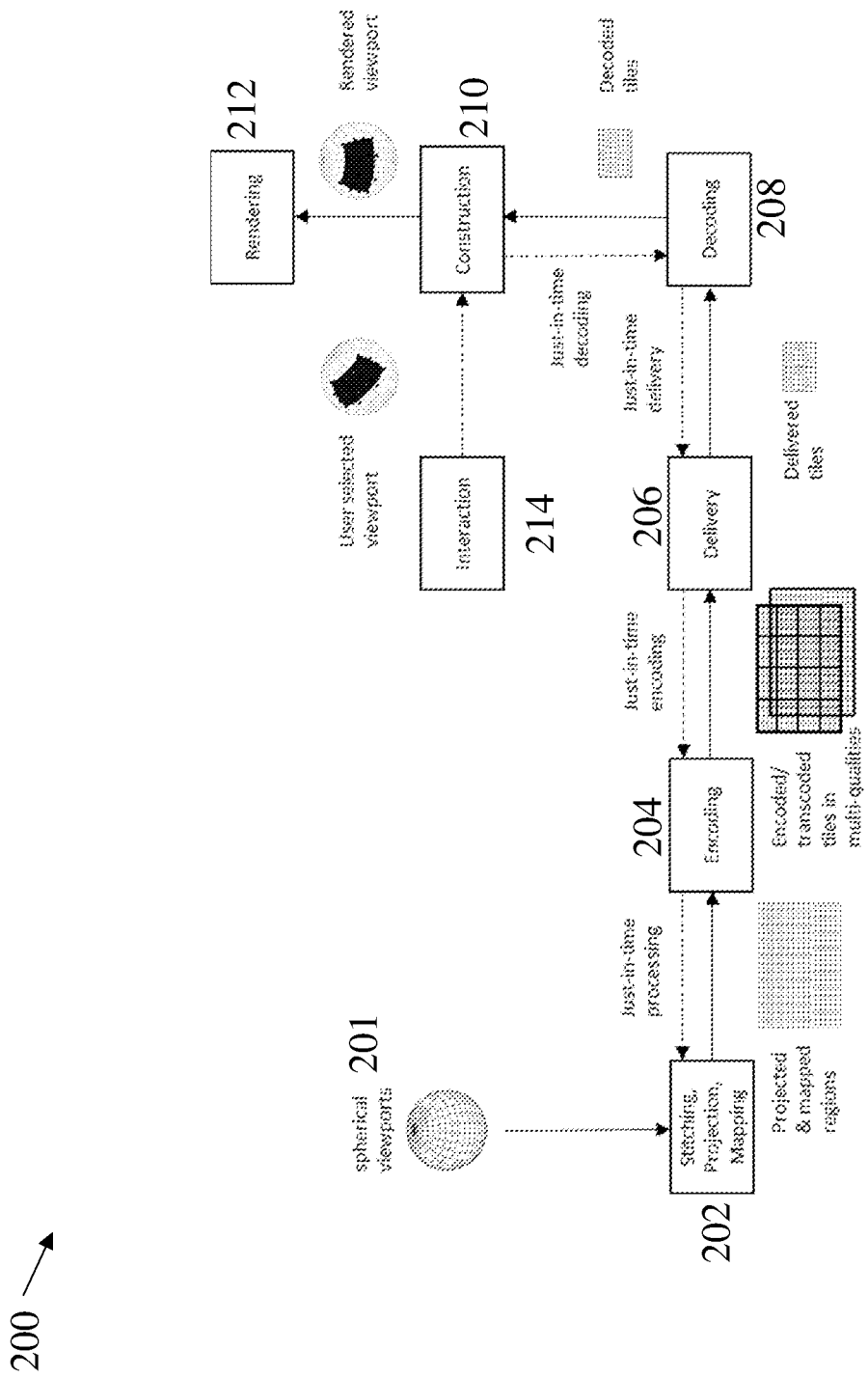
FIG. 2 shows a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 3:
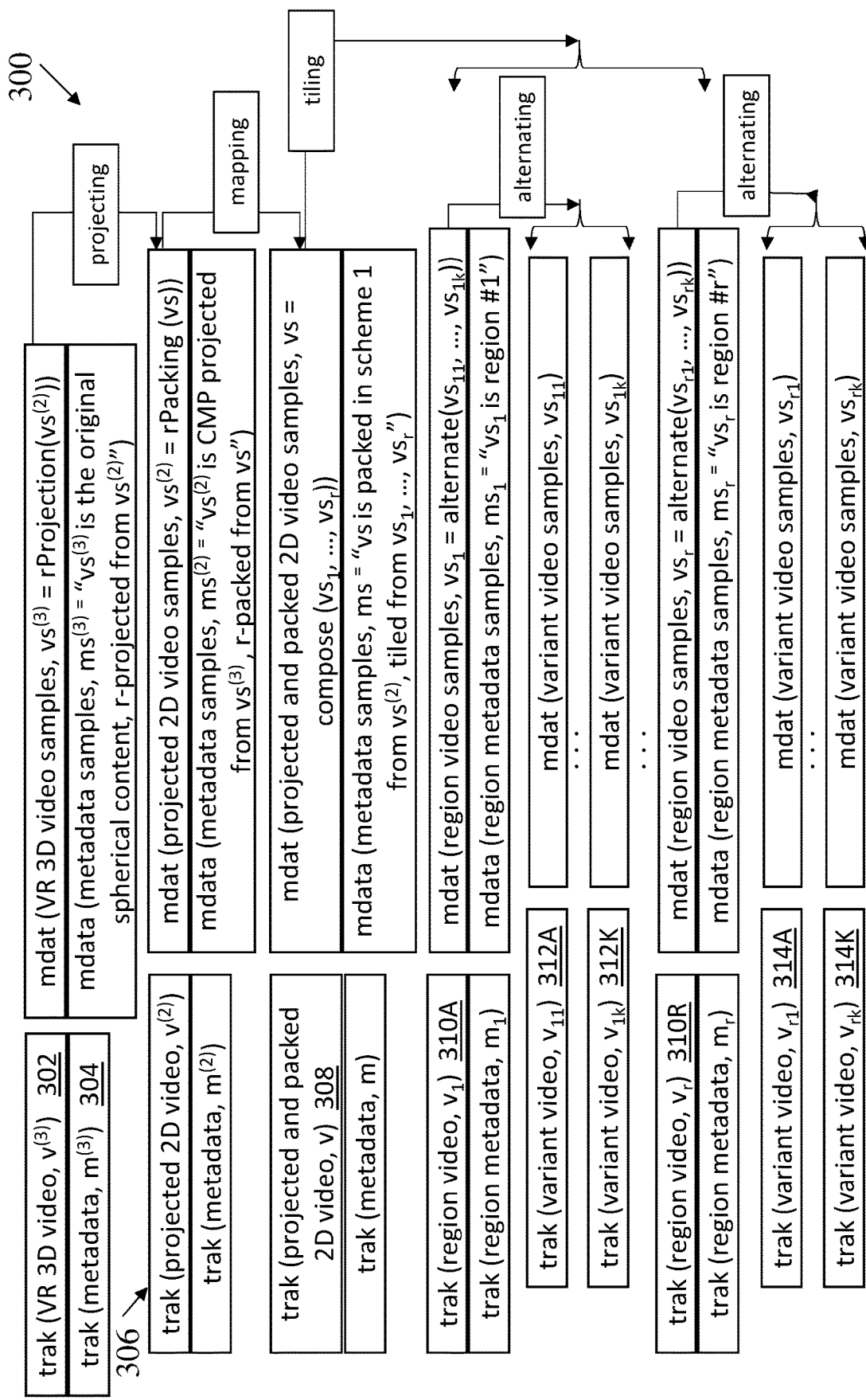
FIG. 3 shows an exemplary track hierarchical structure, according to some embodiments.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118th meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmp1', respectively, for illustrative purposes and are not intended to be limiting. The metadata shown in the metadata tracks are similarly for illustrative purposes and are not intended to be limiting. For example, metadata boxes from OMAF can be used as described in w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306).

A derived visual track can be indicated by its containing sample entry of type 'dtrk'. A derived sample contains an ordered list of the operations to be performed on an ordered list of input images or samples. Each of the operations can be specified or indicated by a Transform Property. A derived visual sample is reconstructed by performing the specified operations in sequence. Examples of transform properties in ISOBMFF that can be used to specify a track derivation, including those in the latest ISOBMFF Technologies Under Consideration (TuC) (see, e.g., N17833, "Technologies under Consideration for ISOBMFF", July 2018, Ljubljana, S K, which is hereby incorporated by reference herein in its entirety), include: the 'idtt' (identity) transform property; the 'clap' (clean aperture) transform property; the 'srot' (rotation) transform property; the 'dslv' (dissolve) transform property; the '2dcc' (ROI crop) transform property; the 'tocp' (Track Overlay Composition) transform property; the 'tgcp' (Track Grid Composition) transform property; the 'tgmc' (Track Grid Composition using Matrix values) transform property; the 'tgsc' (Track Grid Sub-Picture Composition) transform property; the 'tmcp' (Transform Matrix Composition) transform property; the 'tgcp' (Track Grouping Composition) transform property; and the 'tmcp' (Track Grouping Composition using Matrix Values) transform property. All of these track derivations are related to spatial processing, including image manipulation and spatial composition of input tracks.

The techniques described herein improve existing track derivation technology by providing for temporal re-timing operations that can be applied on the composition timeline, can be used in multiple levels of a track hierarchy, or both. A derived track can include temporal sequences of contiguous video data samples. As described herein, portion(s) of the contiguous samples can be in the input tracks, and can be in various forms, such as chucks, fragments, segments, sections, and/or the like. As described above, conventional re-mapping techniques provided in w19027, "WD of Derived visual tracks in the ISO base media file format," Brussels, BE, January 2020, which is hereby incorporated by reference herein in its entirety, leverage an identity transformation and edit list, which provide the output samples of the derived track on the presentation timeline. Further, such track derivation operations cannot take as input a track with an edit list. As a result, conventional re-timing approaches are limited in multiple ways. For example, assume an input track is a twenty minute-long sample. It may be desirable to insert one or more ads or ad breaks at the beginning or middle of the sample. Assume, for example, one thirty-second long ad break is to be added to the beginning of the input track, and another thirty-second long ad break is to be added in the middle of the input track after ten minutes of content. To achieve such a result, the input track needs to be shifted at the beginning by thirty seconds to insert the first ad, and subsequently the input track needs to be shifted in the middle to add the second ad insertion. Using conventional approaches, an edit list with an identity transformation can be used to shift the entirety of the twenty minutes of content of the input track by thirty seconds to insert the first ad. However, it is not possible to perform the second ad insertion since (a) after applying the edit list to move the content by thirty seconds, the samples are on the presentation timeline, and (b) the derived track, which now has the edit list, cannot be used as an input to another derived track.

The techniques described herein provide re-timing derivation operations that can address such shortcomings with conventional techniques. The re-timing derivation operations provided herein (e.g., skip, shift) are provided in a derived track without using edit lists, where the derived track contains samples that contain derivation operations to be applied to samples of an input track to generate the output samples of an output track. Further, the re-timing derivation operations in the derived track can generate the output track on the composition timeline. As a result, the re-timing derivation operations provided herein provide significant flexibility, and can be applied in multiple levels of a track derivation hierarchy. For example, a first re-timing derivation operation can be performed to re-time an input track and generate a re-timed output track (e.g., by skipping and/or shifting the input track). That re-timed output track can then be provided as an input track to a further track derivation operation (e.g., another skip and/or shift derivation operation(s) specified in a second derived track), which can provide for multiple re-timing steps of the media data. Such techniques can therefore provide re-timing capabilities that are not otherwise available with conventional approaches. The re-timing track derivation techniques described herein can be useful in various multimedia processing scenarios, such as those that require adding and/or removing multimedia content. In some embodiments, re-timing track derivations can be used for ad processing. Continuing with the example above, the techniques described herein can re-time a twenty minute-long sample to add one thirty-second long ad break is to the beginning of the input track, and (b) add another thirty-second long ad break to the middle of the input track after ten minutes of content. For example, a derived track can include (a) shift derivation operations for each of the samples from the beginning of the input track up to the second ad break that shift by thirty seconds, and (b) shift derivation operations for each of the samples after the second ad break to the end of the input track that shift those samples by one minute.

Figure 4:
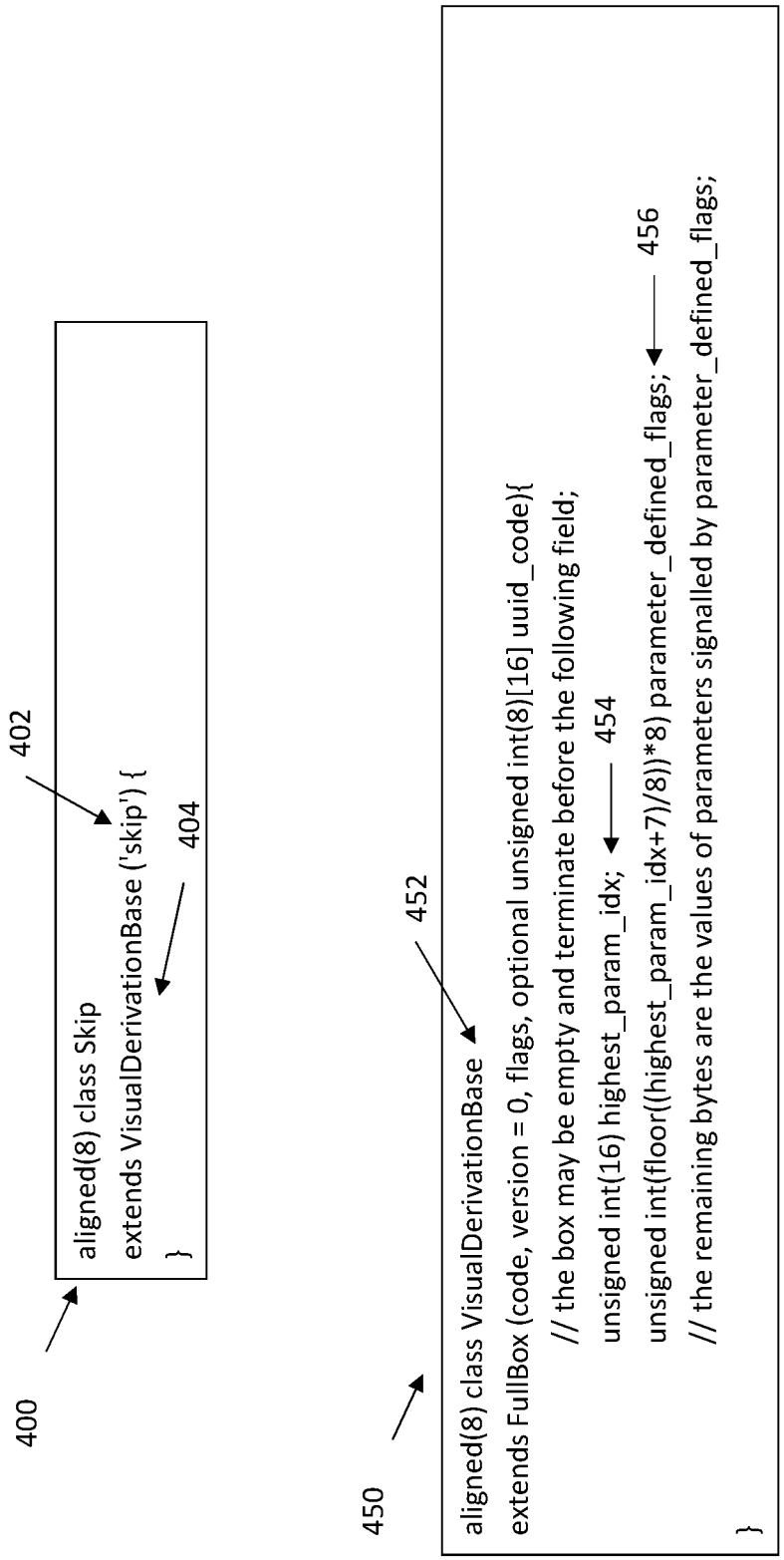
FIG. 4 shows an exemplary syntax for a skip track derivation operation, according to some embodiments.

In some embodiments, one exemplary derivation operation is a skip derivation operation. A skip operation can be used to skip samples of the multimedia content. For example, a skip operation can be specified for a derived track to essentially remove the samples of an input track by not including those samples in the output track, thus effectively skipping a number of media units of the video clip. FIG. 4 shows an exemplary syntax 400 for a skip derivation operation 402, according to some embodiments. The skip derivation operation 402 is not required per sample, but a skip derivation operation 402 can be specified for one or more samples. The skip derivation operation 402 skips, ignores or does not copy the input sample, which therefore removes the sample that carries this operation from the output track. In some embodiments, when the skip transform operation 402 is present in a sample, no other transform operations should be present in the same sample.

In some embodiments, the track derivations can be specified using a visual derivation base (VisualDerivationBase) in a derived track. As shown in the syntax 400, the skip derivation operation extends a visual derivation base 404. A derivation operation can be specified in, for example, a derived sample entry or a derived sample. FIG. 4 also shows an example syntax 450 for a visual derivation base 452, according to some embodiments. In some embodiments, a derivation operation can be represented by a container box of type 'dimg' that carries a derivation transformation box inherited from the visual derivation base. In some embodiments, while not shown, the derivation operation can carry a visual derivation inputs (VisualDerivationInputs) that provides the inputs for the derivation transformation. If no inputs are provided in a derivation operation listed in the sample entry or derived sample, then the visual derivation inputs may be absent.

The highest_param_idx field 454 can provide the index of the parameter with highest index present in the derivation transformation box (e.g., where a default value is 0 when no parameter is present). In some embodiments, the index of a parameter can be given by its order of declaration in a derivation transformation specification. The first parameter can start with an index value to 1. The parameter_defined_flags field 456 can be a bit-mask that indicates which parameter is present in the derivation transformation box. If the $N^{th}$ bit is set to 1, the Nth parameter shall be present, otherwise if the Nth bit is set to 0, the $N^{th}$ parameter shall not be present (e.g., where a default value is 0). In some embodiments, when there is no parameter present in the derivation transformation box, the highest_param_idx 454 and parameter_defined_flags 456 can be omitted (e.g., such that if the box size is equal to an empty box size, it indicates there is no attribute in the box). It should be appreciated that the syntaxes discussed herein, such as the syntaxes 400 and 450 in FIG. 4, are provided for exemplary purposes and are not intended to be limiting. Other naming conventions and/or syntaxes can be used to achieve the techniques described herein. For example, in some embodiments, the track derivations can be specified using a transform property in a derived track.

In some embodiments, the skip operation is specified for one or more samples of an input track, such that various samples can be skipped as desired and thus omitted from the output track. For example, one portion of the input track (e.g., samples at the beginning, middle, or end of the input track) can be omitted from inclusion in the output track as specified by the derived track. As another example, multiple portions of the samples of an input track (e.g., which may be separated by one or more samples) can be omitted from inclusion by the derived track in providing skip derivation operations for the samples associated with those portions. In such examples, a skip derived track can include all samples lined up with samples of an input track, and each of these samples in the derived track contains the skip operation which, when applied to its corresponding sample in the input track, does not copy the input sample as an output sample into an output track. In some embodiments, the resulting derived track is maintained on the composition timeline. Further, the skip derivation operations do not use edit lists. Therefore, the output track (with one or more skipped portions) can be used as an input track to further derivation operations (e.g., a shift derivation operation and/or further skip derivation operations), as necessary and/or desired.

In some embodiments, the skip operation modifies the composition timeline of the samples in an input track (e.g., when the samples are skipped and copied into an output track). As an example, take a derived track that has the first ten samples containing the skip operation and the rest of the samples contain the identity operation. The output track created by applying the operations in the derived track to the input track will have its samples equal to the samples of the input track but from the $11^{th}$ sample onwards, which means that the output track is the input track but skipping the first ten samples. So, the samples of the input track will have different timestamps in the output track of time t−10, where t is the timestamp in the composition timeline of the input track.

Another exemplary track derivation operation is a shift operation. A shift operation can be used to shift the timing of a section of the multimedia content. In some embodiments, a shift operation can essentially change the timing of the video clip by a number of media units. For example, when performing a shift derivation operation, the media samples (e.g., media chunks, fragments, segments, sections, etc.) can be assigned different timestamps in output tracks (e.g., such that a sample in the original input track has a different timestamp in the output track). For example, for a shift operation that shifts by a number of media time units, where the number of time units is n, the sample with timestamp m (m>=0) in the input track will be in the output track with timestamp m+n. Thus, in some embodiments, the shift operation in a sample of a derived track will cause the timestamp of an input sample to shift by n units in the resulting output track (e.g., and does not change timestamp of the sample in the derived track).

Figure 5:
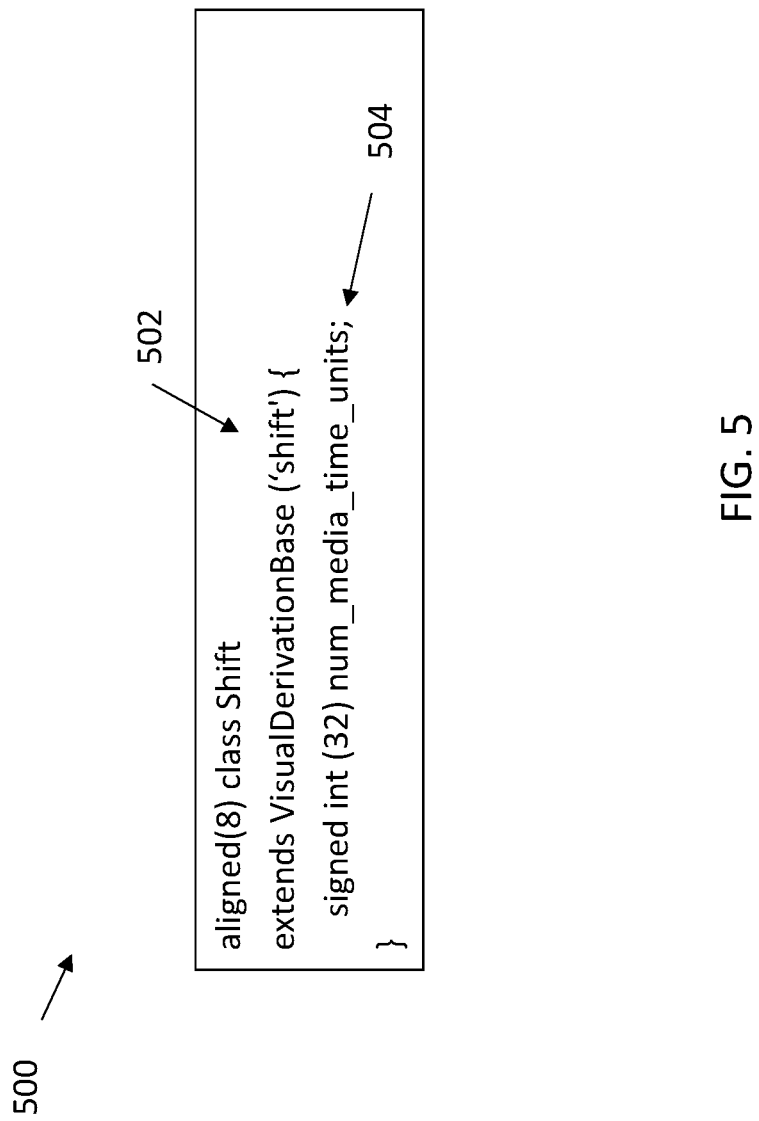
FIG. 5 shows an exemplary syntax for a shift track derivation operation, according to some embodiments.

FIG. 5 shows an exemplary syntax 500 for a shift derivation operation 502, according to some embodiments. As shown with the example syntax 400 in FIG. 4, the shift derivation operation 502 extends a visual derivation base. The shift derivation operation 502 is not required per sample, but a shift derivation operation 502 can be specified for one or more samples. The shift derivation operation 502 shifts the input sample image in a number of media composition time units as specified by the num_media_time_units field 504. The num_media_time_units field 504 can be an integer that specifies a number of units of a timescale (e.g., of the timescale in the Movie Header Box). When num_media_time_units field 504 is negative, the derivation operation can shift the sample timing backward, and when num_media_time_units field 504 is positive, the derivation operation can shift the sample timing forward. In some embodiments, when num_media_time_units 504 is equal to 0, the shift derivation operation can be an identity derivation operation, such that no timing change is performed. In some embodiments, when the shift transform operation is present in a sample, no other transform operations should be present in the same sample.

In some embodiments, the shift operation is specified for one or more samples of an input track, such that various samples can be shifted as desired. For example, one portion of the input track (e.g., samples at the beginning) can be shifted by a first amount (e.g., to provide for a first ad insertion opportunity). As another example, multiple portions of the samples of an input track (e.g., which may be separated by one or more samples) can be shifted by different amounts (e.g., to provide for multiple insertion opportunities). For example, a first portion of the input track can be shifted by a positive n time units, and a second portion of the input track can be shifted by n+x time units, which results in a first ad insertion opportunity for n time units at the beginning of the output track, and a second ad insertion opportunity of x time units after the first portion of the input track. In some embodiments, as described herein, the resulting output track is maintained on the composition timeline. Further, the shift derivation operations do not use edit lists. Therefore, the derived track (with one or more time shifted portions) can be used as an input track to further derivation operations, as necessary and/or desired (e.g., to perform the ad insertions).

Figure 6:
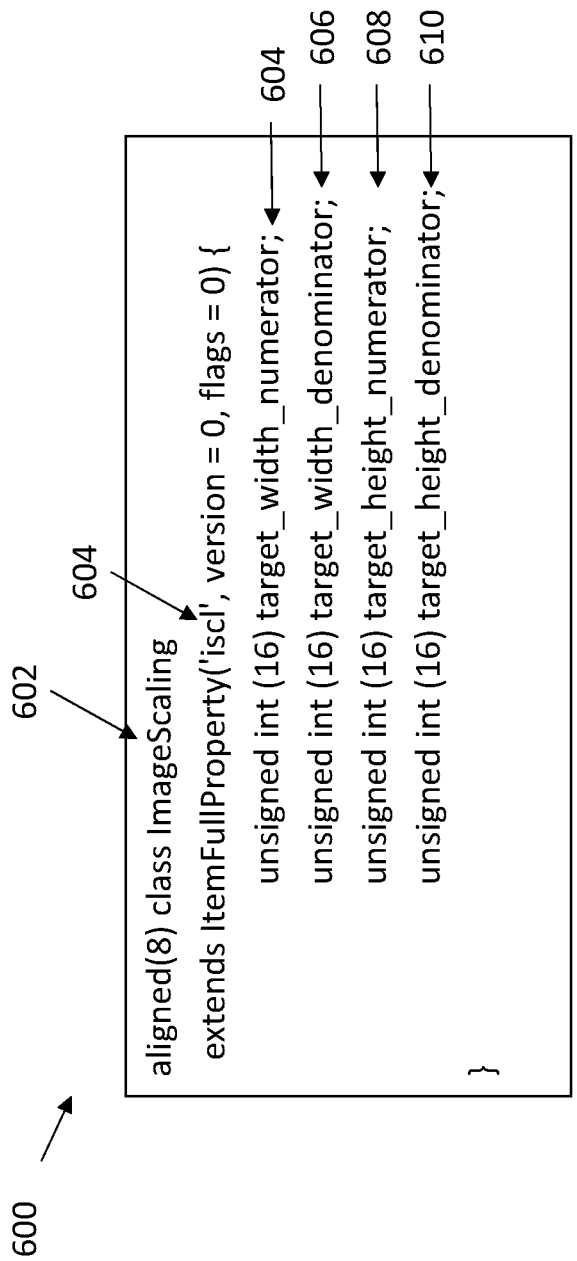
FIG. 6 shows an exemplary syntax for an image scaling operation, according to some examples.

Other forms of video editing can be specified as track derivations that do not change the timing of the content, but change other aspects of the content, such as a scaling operation. FIG. 6 shows an exemplary syntax 600 of an image scaling operation 602. The syntax 600 is provided in, for example, w18586, "Technologies under Consideration on ISO/IEC 23008-12," Brussels, BE, January 2020 for HEIF, which is hereby incorporated by reference herein in its entirety. In this example syntax 600, the image scaling operation 602 is of the box type 'iscl' 604, the property type is a transformative item property, and the container is an ItemPropertyContainerBox. The scaling operation 602 is not required per sample, but one can be included in a sample.

The image scaling 'iscl' transformative item property 604 scales the reconstructed image of the associated image item. The reconstructed image is resized from image_width and image_height pixels (e.g., as specified in the ImageSpatialExtentsProperty associated with the image item) to a target width and height, in pixels, respectively equal to (image_width*target_width_numerator 604)/target_width_denominator 606 and (image_height*target_height_numerator 608)/target_height_denominator 610. The target_width_numerator 604 can specify the numerator of the scaling ratio for the resized image in the horizontal dimension (e.g., and can be restricted so that the value 0 is not used). The target_width_denominator 606 can specify the denominator of the scaling ratio for the resized image in the horizontal dimension (e.g., and can be restricted so that the value 0 is not used). The target_height_numerator 608 can specify the numerator of the scaling ratio for the resized image in the vertical dimension (e.g., and can be restricted so that the value 0 is not used). The target_height_denominator 610 can specify the denominator of the scaling ratio for the resized image in the vertical dimension (e.g., and can be restricted so that the value 0 is not used).

Figure 7:
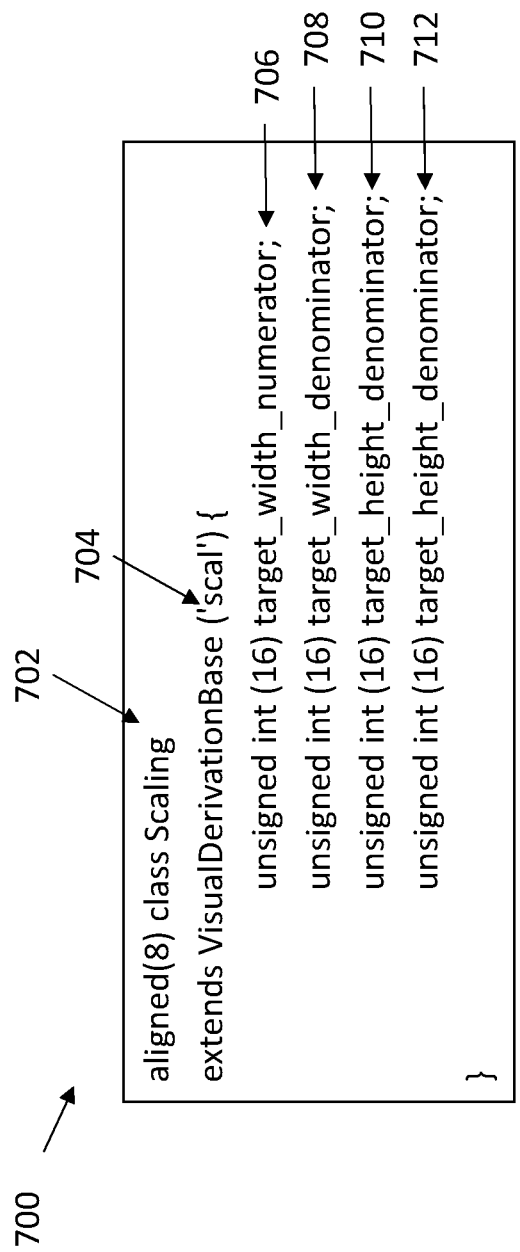
FIG. 7 shows an exemplary syntax for an image scaling track derivation operation, according to some embodiments.

The inventors have appreciated that such scaling operations cannot be provided as transformations of a derived track for video content. Rather, previous approaches are limited to images only, and therefore cannot be used with video content. FIG. 7 shows an exemplary syntax 700 of a scaling derivation operation 702, according to some embodiments. The scaling derivation operation 702 is of the box type 'scal' 704, and is not required per sample but one can be included per sample. The scaling 'scal' 704 transformation operation can scale the derived sample image of the input sample image. The derived sample image can be resized from image_width and image_height pixels of the input sample image to a target width and height, in pixels, respectively equal to (image_width*target_width_numerator 706)/target_width_denominator 708 and (image_height*target_height_numerator 710)/target_height_denominator 712. The target_width_numerator 706 can specify the numerator of the scaling ratio for the derived sample image in the horizontal dimension (e.g., and can be restricted so that the value 0 is not used). The target_width_denominator 708 can specify the denominator of the scaling ratio for the derived sample image in the horizontal dimension (e.g., and can be restricted so that the value 0 is not used). The target_height_numerator 710 can specify the numerator of the scaling ratio for the derived sample image in the vertical dimension (e.g., and can be restricted so that the value 0 is not used). The target_height_denominator 712 can specify the denominator of the scaling ratio for the derived sample image in the vertical dimension (e.g., and can be restricted so that the value 0 is not used).

Figure 8:
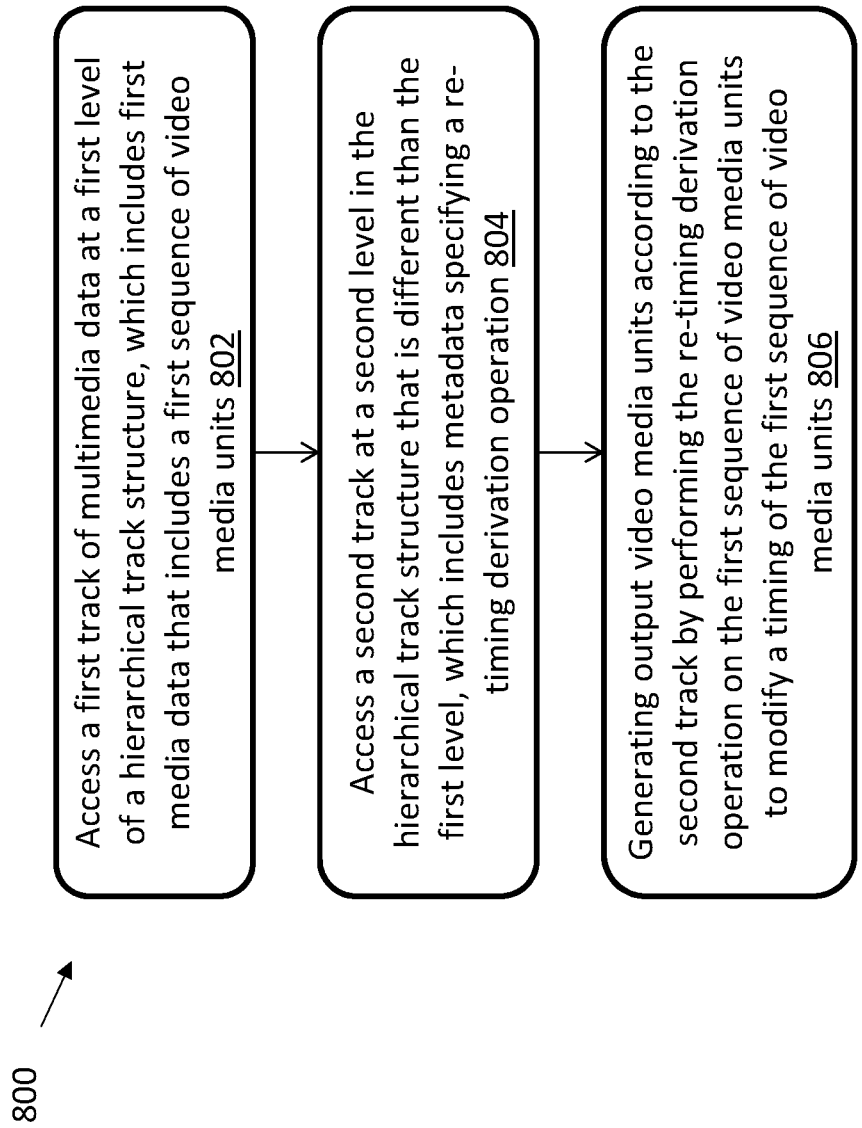
FIG. 8 shows an exemplary computerized method for performing a re-timing track derivation operation, according to some embodiments.

FIG. 8 shows an exemplary computerized method 800 for performing a re-timing operation using a track derivation operation, according to some embodiments. At steps 802 and 804, the computing device (e.g., the encoding device 104 or the decoding device 110) receives multimedia data that has a hierarchical track structure. In particular, at step 802, the computing device receives a first track at a first level of the hierarchical track structure that includes first media data, which can be, for example, one or more input tracks for a derivation operation. The media data of each input track comprises a sequence of video media units (e.g., where each media unit is associated with a different time than other media units in the temporally-related sequence). At step 804, the computing device receives a second track at a second level in the hierarchical track structure that is different than the first level of the first track. The second track includes metadata specifying a re-timing track derivation operation (e.g., skip and/or shift for one or more samples of the derived track). While steps 802 and 804 are shown as separate steps, it should be appreciated that the input track(s) and the track specifying the re-timing track derivation operation can be received in one or a plurality of steps.

At step 806, the computing device generates output video media units (e.g., for an output track) according to the second track. The computing device performs the re-timing derivation operation on the first sequence of video media units to modify a timing of the first sequence of video media units by removing one or more video media units associated with the re-timing derivation operation and/or shifting timing information of the first sequence of video media units. By virtue of performing the re-timing operation, the output media data is re-timed compared to the first media data, and therefore the output media data is different than the first media data of the input track.

In some embodiments as described herein, the derivation operation can be a skip operation. In some embodiments, the first sequence of video media units in the input track includes a sequence of samples, and the metadata of the derived track specifies an operation to skip a sample of the sequence of samples. The techniques can include generating the output video media units by omitting the sample and generating the output video media units so that the output video media units do not include the sample. Multiple skip operations can be specified for associated (different) samples in the input track. In some embodiments, the metadata of the derived track specifies a plurality of operations to skip associated samples of the sequence of samples. The techniques can include generating the output video media units by omitting the samples and generating the output video media units so that the output video media units do not include the samples.

In some embodiments as described herein, the derivation operation can be a shift operation. In some embodiments, each video media unit of the first sequence of video media units of the input track includes an associated media time of a media timeline of the input track. The metadata of the derived track can specify an operation to shift the media timeline by a specified number of time units. The techniques can include generating the output video media units by shifting the media time associated with each video media unit by the specified number of time units to generate the output video media units so that the output video media units have a shifted media timeline. The timeline can be shifted forward in time or backwards in time. In some embodiments, the specified number of time units is a negative value, and the techniques include subtracting the specified number of time units from the media time associated with each video unit. In some embodiments, the specified number of time units is a positive value, and the techniques include adding the specified number of time units to the media time associated with each video unit.

In some embodiments, the techniques can be performed by an encoder and/or a decoder. In some embodiments, the techniques can be used to generate an encoded bitstream according to the techniques described herein (e.g., which include a hierarchical track structure with derived track(s) with re-timing derivation operations). In some embodiments, the techniques can be used to decode an encoded bitstream generated according to the techniques described herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method implemented by at least one processor in communication with a memory, wherein the memory stores computer-readable instructions that, when executed by the at least one processor, cause the at least one processor to perform:
    accessing multimedia data comprising a hierarchical track structure comprising at least:
        a first track at a first level of the hierarchical track structure comprising first media data, wherein the first media data comprises a first sequence of video media units; and
        a second track at a second level in the hierarchical track structure that is different than the first level of the first track, the second track comprising metadata specifying a re-timing derivation operation and not any of the video media units from the first sequence of video media units; and
    generating output video media units according to the second track, comprising performing the re-timing derivation operation on the first sequence of video media units to modify a timing of the first sequence of video media units by one or more of: (a) removing one or more video media units associated with the re-timing derivation operation, (b) shifting timing information of the first sequence of video media units, (c) skipping one or more video media units associated with the re-timing derivation operation and (d) inserting one or more video media units associated with the re-timing derivation operation.

2. The method of claim 1, wherein:
    the first sequence of video media units comprises a sequence of samples;
    the metadata specifies an operation to skip a sample of the sequence of samples; and
    generating the output video media units comprises omitting the sample and generating the output video media units so that the output video media units do not include the sample.

3. The method of claim 1, wherein:
the first sequence of video media units comprises a sequence of samples;
the metadata specifies a plurality of operations to skip associated samples of the sequence of samples; and
generating the output video media units comprises omitting the samples and generating the output video media units so that the output video media units do not include the samples.

4. The method of claim 3, wherein each of the operations is associated with one sample.

5. The method of claim 1, wherein:
each video media unit of the first sequence of video media units comprises an associated media time of a media timeline of the first sequence of video media units;
the metadata specifies an operation to shift the media timeline by a specified number of time units; and
generating the output video media units comprises shifting the media time associated with each video media unit by the specified number of time units and generating the output video media units so that the output video media units comprise a shifted media timeline.

6. The method of claim 5, wherein:
the specified number of time units is a negative value; and
shifting the media time associated with each video media unit by the specified number of time units comprises subtracting the specified number of time units from the media time associated with each video unit.

7. The method of claim 5, wherein:
the specified number of time units is a positive value; and
shifting the media time associated with each video media unit by the specified number of units comprises adding the specified number of time units to the media time associated with each video unit.

8. The method of claim 1, wherein:
the first track is an input track, and the first media data of the first track comprises a plurality of samples; and
the second track comprises a derived track, and the metadata specifies the re-timing derivation operation for a sample of the plurality of samples of the input track; and
generating the output video media units comprises generating output video media samples for an output track.

9. An apparatus comprising a processor in communication with memory, the processor being configured to execute instructions stored in the memory that cause the processor to perform:
accessing multimedia data comprising a hierarchical track structure comprising at least:
a first track at a first level of the hierarchical track structure comprising first media data, wherein the first media data comprises a first sequence of video media units; and
a second track at a second level in the hierarchical track structure that is different than the first level of the first track, the second track comprising metadata specifying a re-timing derivation operation and not any of the video media units from the first sequence of video media units; and
generating output video media units according to the second track, comprising performing the re-timing derivation operation on the first sequence of video media units to modify a timing of the first sequence of video media units by one or more of: (a) removing one or more video media units associated with the re-timing derivation operation, (b) shifting timing information of the first sequence of video media units, (c) skipping one or more video media units associated with the re-timing derivation operation and (d) inserting one or more video media units associated with the re-timing derivation operation.

10. The apparatus of claim 9, wherein:
the first sequence of video media units comprises a sequence of samples;
the metadata specifies an operation to skip a sample of the sequence of samples; and
generating the output video media units comprises omitting the sample and generating the output video media units so that the output video media units do not include the sample.

11. The apparatus of claim 9, wherein:
the first sequence of video media units comprises a sequence of samples;
the metadata specifies a plurality of operations to skip associated samples of the sequence of samples; and
generating the output video media units comprises omitting the samples and generating the output video media units so that the output video media units do not include the samples.

12. The apparatus of claim 11, wherein each of the operations is associated with one sample.

13. The apparatus of claim 9, wherein:
each video media unit of the first sequence of video media units comprises an associated media time of a media timeline of the first sequence of video media units;
the metadata specifies an operation to shift the media timeline by a specified number of time units; and
generating the output video media units comprises shifting the media time associated with each video media unit by the specified number of time units and generating the output video media units so that the output video media units comprise a shifted media timeline.

14. The apparatus of claim 13, wherein:
the specified number of time units is a negative value; and
shifting the media time associated with each video media unit by the specified number of time units comprises subtracting the specified number of time units from the media time associated with each video unit.

15. The apparatus of claim 13, wherein:
the specified number of time units is a positive value; and
shifting the media time associated with each video media unit by the specified number of units comprises adding the specified number of time units to the media time associated with each video unit.

16. The apparatus of claim 9, wherein:
the first track is an input track, and the first media data of the first track comprises a plurality of samples; and
the second track comprises a derived track, and the metadata specifies the re-timing derivation operation for a sample of the plurality of samples of the input track; and
generating the output video media units comprises generating output video media samples for an output track.

17. An apparatus comprising a processor in communication with memory, the processor being configured to execute instructions stored in the memory that cause the processor to perform:
 encoding multimedia data comprising a hierarchical track structure comprising at least:
  a first track at a first level of the hierarchical track structure comprising first media data, wherein the first media data comprises a first sequence of video media units; and
  a second track at a second level in the hierarchical track structure that is different than the first level of the first track, the second track comprising metadata specifying a re-timing derivation operation and not any of the video media units from the first sequence of video media units,
  such that output video media units can be generated according to the second track by performing the re-timing derivation operation on the first sequence of video media units to modify a timing of the first sequence of video media units by one or more of: (a) removing one or more video media units associated with the re-timing derivation operation, (b) shifting timing information of the first sequence of video media units, (c) skipping one or more video media units associated with the re-timing derivation operation and (d) inserting one or more video media units associated with the re-timing derivation operation.

18. The apparatus of claim 17, wherein:
 the first sequence of video media units comprises a sequence of samples; and
 the metadata specifies an operation to skip a sample of the sequence of samples,
 such that the output video media units can be generated by omitting the sample and generating the output video media units so that the output video media units do not include the sample.

19. The apparatus of claim 17, wherein:
 the first sequence of video media units comprises a sequence of samples; and
 the metadata specifies a plurality of operations to skip associated samples of the sequence of samples,
 such that the output video media units can be generated by omitting the samples and generating the output video media units so that the output video media units do not include the samples.

20. The apparatus of claim 19, wherein each of the operations is associated with one sample.

* * * * *